US012081451B2

(12) United States Patent
Brandwine et al.

(10) Patent No.: US 12,081,451 B2
(45) Date of Patent: *Sep. 3, 2024

(54) RESOURCE PLACEMENT TEMPLATES FOR VIRTUAL NETWORKS

(71) Applicant: Amazon Technologies, Inc., Seattle, WA (US)

(72) Inventors: Eric J. Brandwine, Haymarket, VA (US); Marvin M. Theimer, Bellevue, WA (US); Don Johnson, Seattle, WA (US); Swaminathan Sivasubramanian, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 102 days.

This patent is subject to a terminal disclaimer.

(21) Appl. No.: 15/583,547

(22) Filed: May 1, 2017

(65) Prior Publication Data

US 2017/0353394 A1    Dec. 7, 2017

Related U.S. Application Data

(60) Division of application No. 13/936,097, filed on Jul. 5, 2013, now Pat. No. 9,641,450, which is a
(Continued)

(51) Int. Cl.
*H04L 47/70*       (2022.01)
*G06F 9/50*        (2006.01)
(Continued)

(52) U.S. Cl.
CPC ............ *H04L 47/70* (2013.01); *G06F 9/5077* (2013.01); *G06F 21/53* (2013.01); *H04L 67/10* (2013.01); *G06F 2221/2149* (2013.01)

(58) Field of Classification Search
CPC ................................ H04L 47/70; H04L 67/10
See application file for complete search history.

(56) References Cited

U.S. PATENT DOCUMENTS

| 6,307,857 B1 | 10/2001 | Yokoyama et al. | |
| 2008/0240122 A1* | 10/2008 | Richardson | H04L 12/66 370/401 |

(Continued)

OTHER PUBLICATIONS

How the Net works: An Introduction to Peering and Transit; Rudolph van der Berg; dated Sep. 2, 2008.
(Continued)

*Primary Examiner* — Hua Fan
(74) *Attorney, Agent, or Firm* — Knobbe, Martens, Olson & Bear, LLP

(57) ABSTRACT

With the advent of virtualization technologies, networks and routing for those networks can now be simulated using commodity hardware. For example, virtualization technologies can be adapted to allow a single physical computing machine to be shared among multiple virtual networks by providing one or more virtual machines simulated in software by the single physical computing machine, with each virtual machine acting as a distinct logical computing system. In addition, as routing can be accomplished through software, additional network setup flexibility can be provided to the virtual network in comparison with hardware-based routing. In some implementations, virtual network setup can be abstracted through the use of resource placement templates, allowing users to create virtual networks compliant with a customer's networking policies without necessarily having knowledge of what those policies are.

19 Claims, 6 Drawing Sheets

Related U.S. Application Data continuation of application No. 12/892,850, filed on Sep. 28, 2010, now Pat. No. 8,484,353.

(51) Int. Cl.
    *G06F 21/53*     (2013.01)
    *H04L 67/10*     (2022.01)

(56) References Cited

U.S. PATENT DOCUMENTS

| | | | |
|---|---|---|---|
| 2008/0244579 A1 | 10/2008 | Muller | |
| 2008/0271137 A1* | 10/2008 | Sinn | H04L 12/4633 726/15 |
| 2009/0327392 A1* | 12/2009 | Tripathi | G06F 15/161 709/201 |
| 2010/0049851 A1 | 2/2010 | Garrison et al. | |
| 2010/0074141 A1* | 3/2010 | Nguyen | H04L 41/12 370/254 |

OTHER PUBLICATIONS

VL2: A Scalable and Flexible Data Center Network; Albert Greenberg, et al.; dated Aug. 2009.
Cisco Policy Based Routing White Paper; accessed Jun. 7, 2010.
Internet Security Systems, Distributed Denial of Service Attack Tools; accessed Jun. 7, 2010.
B. Pfaff, et al., Extending Networking into the Virtualization Layer, Proceedings of the 8$^{th}$ ACM Workshop on Hot Topics in Networks (HotNets-VIII), New York City, New York (Oct. 2009).
A. Greenberg, et al., Towards A Next Generation Data Center Architecture: Scalability and Commoditization, dated Aug. 22, 2008.
P. Barham, et al., Xen and the Art of Virtualization, SOSP'03, Oct. 19-22, 2003.

\* cited by examiner

RESOURCE PLACEMENT TEMPLATES FOR VIRTUAL NETWORKS

CROSS REFERENCE TO RELATED APPLICATIONS

This application is a divisional of U.S. patent application Ser. No. 13/936,097, filed on Jul. 5, 2013 and soon to issue as U.S. Pat. No. 9,641,450, which is a continuation of U.S. patent application Ser. No. 12/892,850, filed on Sep. 28, 2010 and issued as U.S. Pat. No. 8,484,353, the entire disclosure of which are hereby incorporated by reference herein.

BACKGROUND

Generally described, computing devices utilize a communication network, or a series of communication networks, to exchange data. In some situations, data to be exchanged is divided into a series of packets that can be transmitted between a sending computing device and a recipient computing device. In general, each packet can be considered to include two primary components, namely, control information and payload data. The control information corresponds to information utilized by one or more communication networks to deliver the payload data. For example, control information can include source and destination network addresses, error detection codes, and packet sequencing identification, and the like. Typically, control information is found in packet headers and trailers included within the packet and adjacent to the payload data.

In practice, in a packet-switched communication network, packets are transmitted between multiple physical networks, or sub-networks. Generally, the physical networks include a number of hardware devices that receive packets from a source network component and forward the packet to a recipient network component. The packet routing hardware devices are typically referred to as routers. Generally described, routers can operate with two primary functions or planes. The first function corresponds to a control plane, in which the router learns the set of outgoing interfaces that are most appropriate for forwarding received packets to specific destinations. The second function is a forwarding plane, in which the router sends the received packet to an outbound interface.

With the introduction of virtualization technology, a computing service provider can now provide computing resources to customers dynamically and/or in a scalable manner. As the computing resource demands of the customer increase, the computing service provider can allocate additional computing resources. Such resources can be provided to the customer as part of a virtual network connectable to the customer's own physical network. These computing resources can be provided to a customer transparently, without the customer's knowledge of where on an associated physical network such a resource exists.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

With the advent of virtualization technologies, networks and routing for those networks can now be simulated using commodity hardware. For example, virtualization technologies such as those provided by VMware, XEN, or User-Mode Linux can be adapted to allow a single physical computing machine to be shared among multiple virtual networks by providing one or more virtual machines simulated in software by the single physical computing machine, with each virtual machine acting as a distinct logical computing system. In addition, as routing can be accomplished through software, additional network setup flexibility can be provided to the virtual network in comparison with hardware-based routing. In some implementations, virtual network setup can be abstracted through the use of resource placement templates, allowing users to create virtual networks compliant with a customer's networking policies without necessarily having knowledge of what those policies are.

In this disclosure, techniques are described for providing logical networking functionality for managed computer networks, such as for virtual computer networks that are provided on behalf of users or other entities. In at least some embodiments, the techniques enable a user to add computing resources to the virtual computer network using resource placement templates (RPTs). These RPTs allow a user to configure or specify a network topology and/or routing paths for a virtual or overlay computer network. With the network configuration specified for a virtual computer network, the functionally and operation of the virtual network can be simulated on physical computing nodes operating virtualization technologies.

In some embodiments, multiple users or entities (e.g. businesses or other organizations) can access the system as tenants of the system, each having their own virtual network in the system. Different entities may have different networking polices for their respective virtual network, which can coexist on the same physical network.

Figure 1:
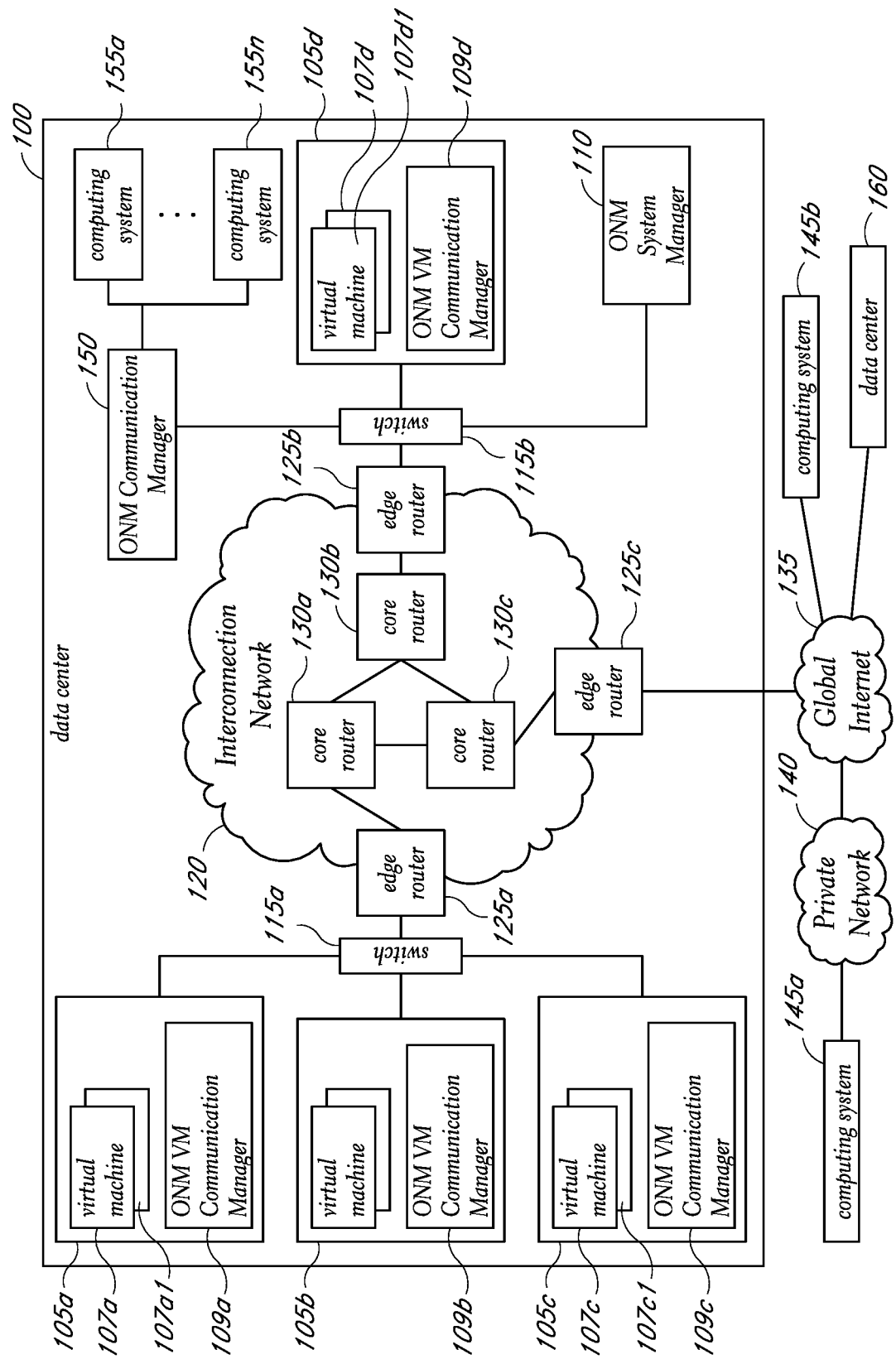
FIG. 1 is a network diagram illustrating an embodiment of an overlay network manager (ONM) system for managing computing nodes associated with a virtual computer network.

By way of overview, FIG. 1 illustrates an embodiment where communications between multiple computing nodes of the virtual computer network emulate functionality that would be provided by logical networking devices if they were physically present. In some embodiments, some or all of the emulation are performed by an overlay network manager system. FIGS. 2-6 discuss embodiments of virtual computer networks supporting the use of RPTs to describe and/or control the operation of virtual networks or subnets of those networks.

Overlay Network Manager

FIG. 1 is a network diagram illustrating an embodiment of an overlay network manager system (ONM) for managing computing nodes associated with a virtual computer network. Virtual network communications can be overlaid on one or more intermediate physical networks in a manner transparent to the computing nodes. In this example, the ONM system includes a system manager module 110 and multiple communication manager modules 109a, 109b, 109c, 109d, 150 to facilitate the configuring and managing communications on the virtual computer network.

The illustrated example includes an example data center 100 with multiple physical computing systems operated on behalf of the ONM system. The example data center 100 is connected to a global internet 135 external to the data center 100. The global internet can provide access to one or more computing systems 145a via private network 140, to one or more other globally accessible data centers 160 that each have multiple computing systems, and to one or more other computing systems 145b. The global internet 135 can be a publicly accessible network of networks, such as the Internet, and the private network 140 can be an organization's network that is wholly or partially inaccessible from computing systems external to the private network 140. Computing systems 145b can be home computing systems or mobile computing devices that each connects directly to the global internet 135 (e.g., via a telephone line, cable modem, a Digital Subscriber Line ("DSL"), cellular network or other wireless connection, etc.).

The example data center 100 includes a number of physical computing systems 105a-105d and 155a-155n, as well as a Communication Manager module 150 that executes on one or more other computing systems to manage communications for the associated computing systems 155a-155n. The example data center further includes a System Manager module 110 that executes on one or more computing systems. In this example, each physical computing system 105a-105d hosts multiple virtual machine computing nodes and includes an associated virtual machine ("VM") communication manager module (e.g., as part of a virtual machine hypervisor monitor for the physical computing system). Such VM communications manager modules and VM computing nodes include VM Communication Manager module 109a and virtual machines 107a on host computing system 105a, and VM Communication Manager module 109d and virtual machines 107d on host computing system 105d. Physical computing systems 155a-155n do not execute any virtual machines in this example, and thus can each act as a computing node that directly executes one or more software programs on behalf of a user. The Communication Manager module 150 that manages communications for the associated computing systems 155a-155n can have various forms, such as, for example, a proxy computing device, firewall device, or networking device (e.g., a switch, router, hub, etc.) through which communications to and from the physical computing systems travel. In other embodiments, all or none of the physical computing systems at the data center host virtual machines.

This example data center 100 further includes multiple physical networking devices, such as switches 115a-115b, edge router devices 125a-125c, and core router devices 130a-130c. Switch 115a is part of a physical sub-network that includes physical computing systems 105a-105c, and is connected to edge router 125a. Switch 115b is part of a distinct physical sub-network that includes physical computing systems 105d and 155a-155n, as well as the computing systems providing the Communication Manager module 150 and the System Manager module 110, and is connected to edge router 125b. The physical sub-networks established by switches 115a-115b, in turn, are connected to each other and other networks (e.g., the global internet 135) via an intermediate interconnection network 120, which includes the edge routers 125a-125c and the core routers 130a-130c. The edge routers 125a-125c provide gateways between two or more sub-networks or networks. For example, edge router 125a provides a gateway between the physical sub-network established by switch 115a and the interconnection network 120, while edge router 125c provides a gateway between the interconnection network 120 and global internet 135. The core routers 130a-130c manage communications within the interconnection network 120, such as by routing or otherwise forwarding packets or other data transmissions as appropriate based on characteristics of such data transmissions (e.g., header information including source and/or destination addresses, protocol identifiers, etc.) and/or the characteristics of the interconnection network 120 itself (e.g., routes based on the physical network topology, etc.).

The System Manager module 110 and Communication Manager modules 109, 150 can configure, authorize, and otherwise manage communications between associated computing nodes, including providing logical networking functionality for one or more virtual computer networks that are provided using the computing nodes. For example, Communication Manager module 109a and 109c manages associated virtual machine computing nodes 107a and 107c and each of the other Communication Manager modules can similarly manage communications for a group of one or more other associated computing nodes. The Communication Manager modules can configure communications between computing nodes so as to overlay a virtual network over one or more intermediate physical networks that are used as a substrate network, such as over the interconnection network 120.

Furthermore, a particular virtual network can optionally be extended beyond the data center 100, such as to one or more other data centers 160 which can be at geographical locations distinct from the first data center 100. Such data centers or other geographical locations of computing nodes can be inter-connected in various manners, including via one or more public networks, via a private connection such as a direct or VPN connection, or the like. In addition, such data centers can each include one or more other Communication Manager modules that manage communications for computing systems at that data. In some embodiments, a central Communication Manager module can coordinate and manage communications among multiple data centers.

Thus, as one illustrative example, one of the virtual machine computing nodes 107a1 on computing system 105a can be part of the same virtual local computer network as one of the virtual machine computing nodes 107d1 on computing system 105d. The virtual machine 107a1 can then direct an outgoing communication to the destination virtual machine computing node 107d1, such as by specifying a virtual network address for that destination virtual machine computing node. The Communication Manager module 109a receives the outgoing communication, and in at least some embodiments determines whether to authorize the sending of the outgoing communication. By filtering unauthorized communications to computing nodes, network isolation and security of entities' virtual computer networks can be enhanced.

The Communication Manager module 109a can determine the actual physical network location corresponding to the destination virtual network address for the communication. For example, the Communication Manager module 109a can determine the actual destination network address by dynamically interacting with the System Manager module 110, or can have previously determined and stored that information. The Communication Manager module 109a then re-headers or otherwise modifies the outgoing communication so that it is directed to Communication Manager module 109d using an actual substrate network address.

When Communication Manager module 109d receives the communication via the interconnection network 120, it obtains the virtual destination network address for the communication (e.g., by extracting the virtual destination network address from the communication), and determines to which virtual machine computing nodes 107d the communication is directed. The Communication Manager module 109d then re-headers or otherwise modifies the incoming communication so that it is directed to the destination virtual machine computing node 107d1 using an appropriate virtual network address for the virtual computer network, such as by using the sending virtual machine computing node 107a1's virtual network address as the source network address and by using the destination virtual machine computing node 107d1's virtual network address as the destination network address. The Communication Manager module 109d then forwards the modified communication to the destination virtual machine computing node 107d1. In at least some embodiments, before forwarding the incoming communication to the destination virtual machine, the Communication Manager module 109d can also perform additional steps related to security.

Further, the Communication Manager modules 109a and/or 109c on the host computing systems 105a and 105c can perform additional actions that correspond to one or more logical specified router devices lying between computing nodes 107a1 and 107c1 in the virtual network topology. For example, the source computing node 107a1 can direct a packet to a logical router local to computing node 107a1 (e.g., by including a virtual hardware address for the logical router in the packet header), with that first logical router being expected to forward the packet to the destination node 107c1 via the specified logical network topology. The source Communication Manager module 109a receives or intercepts the packet for the logical first router device and can emulate functionality of some or all of the logical router devices in the network topology, such as by modifying a TTL ("time to live") hop value for the communication, modifying a virtual destination hardware address, and/or otherwise modify the communication header. Alternatively, some or all the emulation functionality can be performed by the destination Communication Manager module 109c after it receives the packet.

By providing logical networking functionality, the ONM system provides various benefits. For example, because the various Communication Manager modules manage the overlay virtual network and can emulate the functionality of logical networking devices, in certain embodiments specified networking devices do not need to be physically implemented to provide virtual computer networks, allowing greater flexibility in the design of virtual user networks. Additionally, corresponding modifications to the interconnection network 120 or switches 115a-115b are generally not needed to support particular configured network topologies. Nonetheless, a particular network topology for the virtual computer network can be transparently provided to the computing nodes and software programs of a virtual computer network.

Resource Allocation on a Virtual Network

Figure 2:
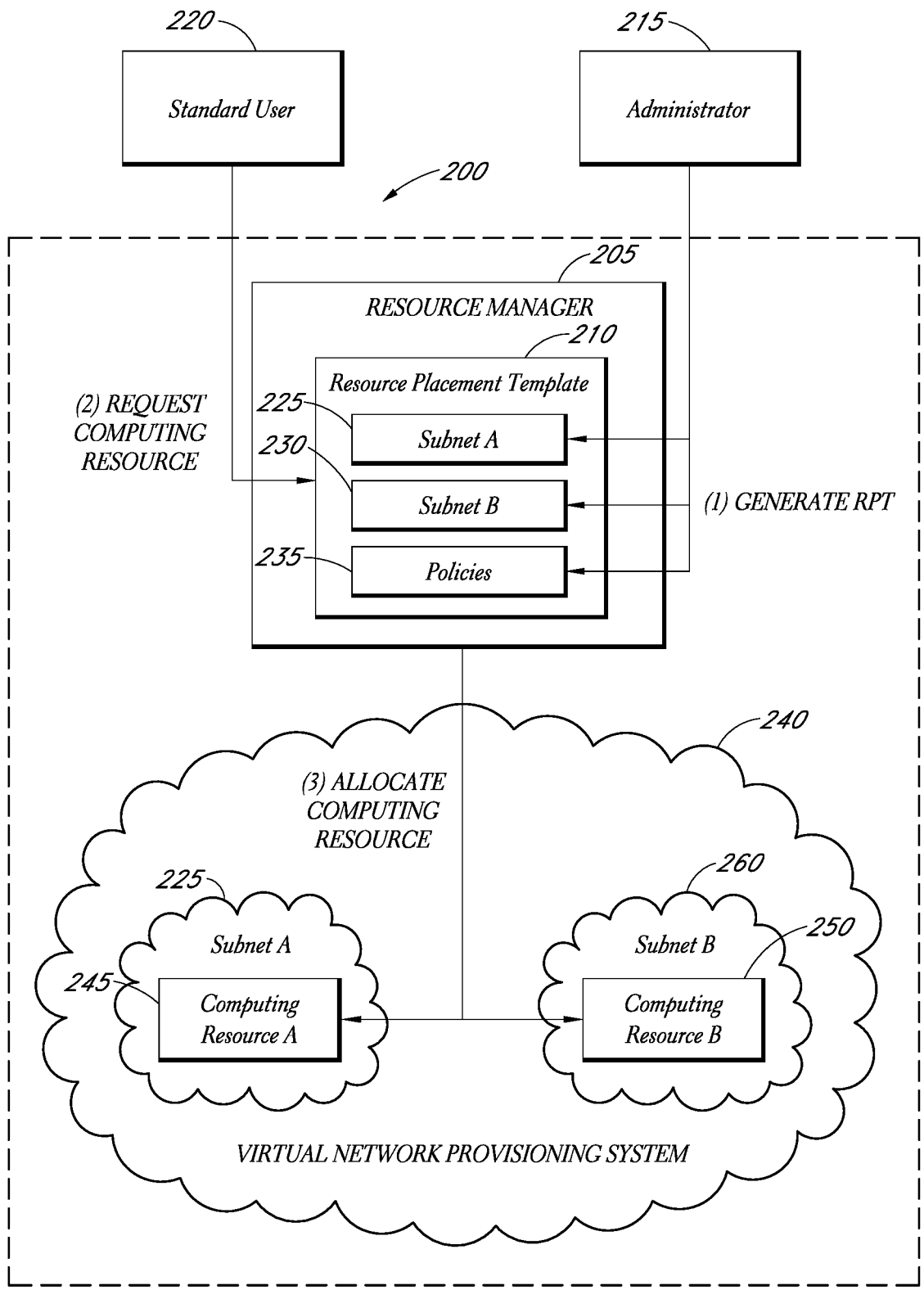
FIG. 2 illustrates an implementation of a resource management system for allocating computing resources to a customer.

FIG. 2 illustrates a resource management system 200 for allocating computing resources to a customer. The resource management system can include a resource manager 205 for generating, storing, and/or applying resource placement templates (RPTs) 210 associated with the network policies of the customer. The resource manager 205 can include a data interface, such as a web page or application, for receiving data from the customer. The resource manager 205 can be implemented on a computing system with one or more computing devices. The resource manager 205 can be part of or in communication with computing systems 240 of a computing resources provider, such as an ONM system. In one embodiment, the resource management system 200 is associated with a single data center. In another embodiment, the resource management system 200 allocates resource for several data centers. In some embodiments, one or more data centers may be grouped into independent availability zones, where each availability zone can be expected to remain operating regardless of the status of other availability zones.

Customers of the computing resources provider can be individuals, businesses, groups, or other entities desiring virtual computing resources. A customer, for example, a large business or research institution, can have users that include both network administrators 215 (including security administrators) and standard (e.g., non-administrative) users 220.

The resource manager 205 can store a plurality of RPTs 210, with one or more RPTs for each customer. In one embodiment, a RPT is an entry or entries in a lookup table or database. In one embodiment, the RPT is a data file, such as an XML file, text file, or the like. In one embodiment, the RPT can contain executable code. For example, the RPT can include code for creating a new virtual subnet in a virtual network or for otherwise modifying the virtual network.

The RPT 210 represents the networking policies of a customer. In one embodiment, the RPT comprises placement policies 235 that determine where to allocate computing resources to the virtual network. In one embodiment, allocating computing resources comprises assigning virtual computing resources to the virtual network. As virtual computing resources are simulated by one or more physical computing nodes, the capabilities of the physical computing nodes become available to users of the virtual network. In another embodiment, computing resources may be allocated directly to the virtual network.

In some embodiments, allocation of a computing resource to a virtual subnet of the virtual network results in the computing resource adopting the access constraints of the subnet, such as the subnet's access policies and/or topology constraints, such that the computing resource behaves as if it were located on the subnet. For example, if the subnet is configured to access only certain networks but not others, then the computing resource behaves similarly. Access policies and/or topology constraints can include subnet masks, firewalls, connections or lack of connections to other subnets or networks, or similar constraints.

In one embodiment, the RPT 210 comprises a reference to one or more subnets 225, 230. For example, a network administrator selects the appropriate subnets in which a computing resource for particular use can be allocated and includes a reference to those subnets in the RPT for that particular use. In one embodiment, the RPT can include selection criteria for subnets. For example, instead of having specified subnets, subnets can be selected based on specified criteria, such as, for example, load level, network topology, processing power, network speed, bandwidth, latency and/or access policies.

After a RPT 210 is created, it can be stored by the resource management system 200 in non-volatile memory. In one embodiment, the RPT is stored in a database. When a user requests the allocation of resources from the resource management system 200, the user can provide or specify the RPT, for example, through a drop down menu or other field on a user interface provided by a web site or application. The resource management system 200 can then allocate the computing resource according to the policies specified by the RPT. In order to further explain embodiments of the operation of the resource management system 200, an example scenario is discussed below.

In an example scenario, a network administrator 215 of the customer is in charge of providing a secure network to the customer, for example, by instituting network policies controlling network design, security and/or topology, monitoring network traffic, and/or securing the customer network from attack. The network administrator 215 can also be in charge of procuring or managing scalable, virtualized computing resources from a computing resources provider. As the network administrator 215 is familiar with the working of physical networks and may already have software or tools for managing physical networks, the computing resources can be provided by the computing resources provider as a virtual network. In addition, the virtual network can be configured to connect with the customer's existing physical network. Further, the virtual network can be provided using a topology specified by the network administrator in order to comply with the network policies of the customer. The virtual network can comprise multiple virtual subnets, in which communication between subnets may be restricted or controlled, for example, by using firewalls, network filtering devices, and/or network monitoring devices, which may be virtual devices. In one example, computing resources allocated to different departments may be separated by one or more firewalls. In another example, computing resources reachable by the public (e.g. computing systems with public IP addresses) may be on a subnet of the customer network isolated from or with limited and/or controlled connectivity to other subnets of the customer. These network policies can be implemented using one or more resource placement templates 210.

Continuing with the example scenario, the network administrator 215 can generate a RPT 210 for department A of the customer, for example, via a data interface to the resource manager 205. In one embodiment, the data interface comprises an API call. In another embodiment, the data interface can be a user interface that can be used to define the RPT. The RPT can identify virtual subnets 225, 230 in which to allocate computing resources. The RPT can also include placement polices 235 for determining where to allocate a virtual computing resource in a particular virtual subnet. In one example, the RPT identifies a single subnet and includes a placement policy specifying that all resources be placed in that subnet. In another example, the RPT can identify multiple subnets and includes policies specifying allocation rules between the multiple subnets. The placement policies 235 can also include selection criteria such as first fit, load balancing, least full, round robin, or the like, for selecting a subnet in which to place a computing resource. The placement policies 235 can allow balancing of the network and/or computing load between different subnets. Generally, the network administrator 215 specifies the subnets 225, 230 and policies 235 of the RPT 210, though other customer employees may also generate RPTs.

Meanwhile, the customer may also have standard users 220 who wish to request virtual computing resources but may not necessarily have the knowledge to comply with the customer's network policies. However, as RPTs 210 can allow abstraction of the customer's network policies, the RPTs can simplify compliance for users. In one embodiment, the standard user 220, via a data interface of the resource manager 205 such as an API call or user interface, requests virtual computing resources. For example, the standard user 220 can request computing resource A 245 and computing resource B 250, which can be processing power, storage, a database, a backup server, web server or the like. The user 220 can select a pre-established RPT based on criteria such as computing resource use, type of resource, such as a database, backup server, or web server, user department affiliation, user identity, level of security, service level, or the like. For example, the user 220 can request a "web server" resource using a "web server" RPT. The RPT 210 and resource request are then provided to the resource manager 205.

Continuing with the example scenario, when the resource manager 205 receives the RPT 205 and resource request, it communicates with the virtual network provisioning system 240, such as the ONM system of FIG. 1, to allocate the computing resources 245, 250. Based on the RPT 210, the resource manager 205 specifies the placement of the computing resources 245, 250 on one or more subnets of the customer. For example, the RPT 210 can specify that computing resource A 245 be allocated on subnet A 255 and that computing resource B 250 be allocated on subnet B 260. As will be apparent, the computing resources can be allocated among subnets in a variety of ways, depending on the constraints placed by the RPT 205. For example, resources can be placed on the same subnet or on separate subnets. Subnets may be preexisting or generated as a result of the resource request.

While the system has been described as being used by administrators and standard users of the customer, the system can be used by many different types of users. Users of the system can include, administrators, standard users, consultants, customers of the customer, and/or other entities associated with the customer. Further, while the above example describes an administrator as generating the RPT, any user can generate RPTs. Likewise, any user can use the RPTs to specify how computing resources are allocated.

Figure 3A:
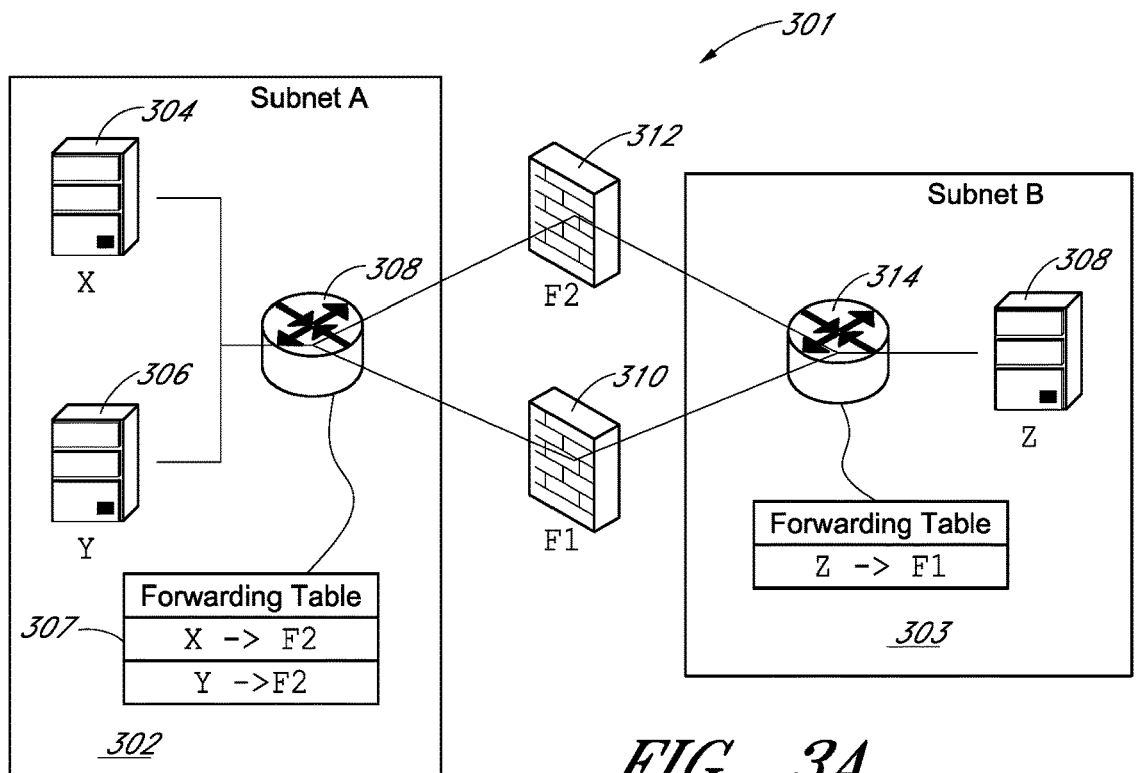
FIGS. 3A and 3B illustrate block diagrams of a virtual network and a corresponding substrate physical network, respectively.
Figure 3B:
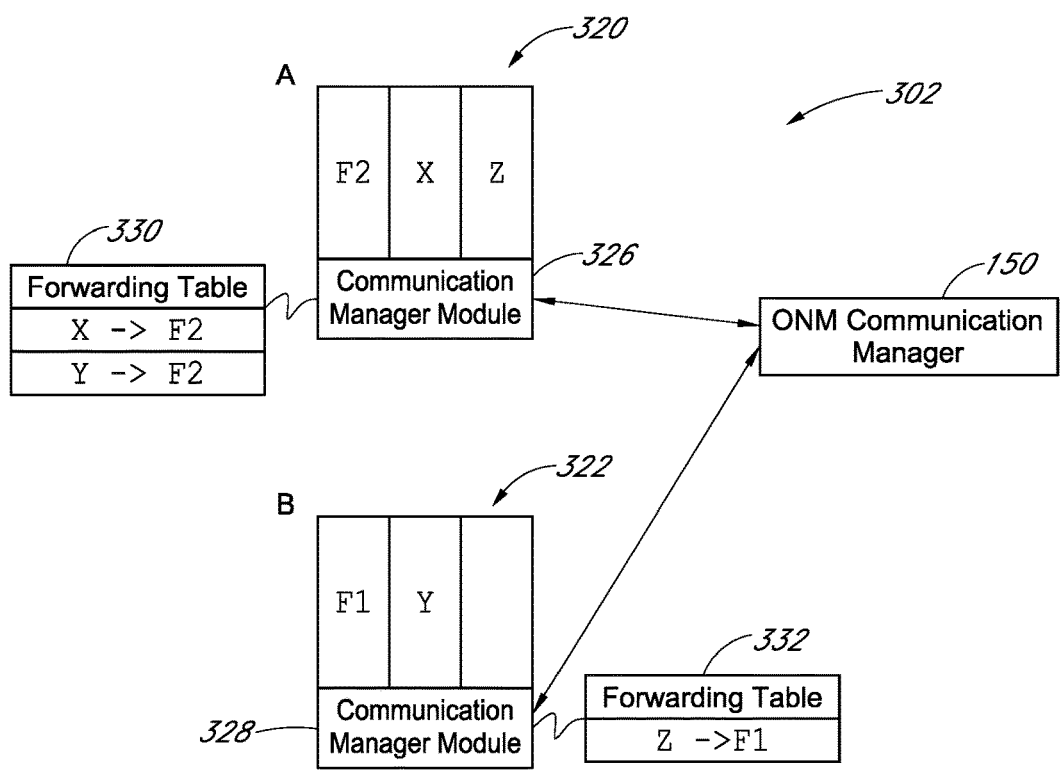

FIGS. 3A and 3B illustrate block diagrams of a virtual network 301 and a corresponding substrate physical network 302. FIG. 3A illustrates a virtual network including several virtual computing resources allocated in subnet A 302 and subnet B 303, such as computing nodes and/or network devices. In one example, a standard user 220 requests the allocation of computing nodes X 304, Y 308, and Z 306. Virtual computing nodes X and Y are connected to a logical router 308. The logical router 308 is connected to firewalls F1 310 and F2 312. The logical router 308 is configured to direct traffic from X to F2 and Y to F2, as would be the case if F1 were a backup firewall. The forwarding table 307 associated with logical router 309 reflects this traffic configuration. F1 and F2 are connected to a second logical router 314. The second logical router is connected to virtual computing node Z 308. Thus, based on the topology and associated forwarding table of the virtual network 301, traffic from X and Y to Z pass through F2 or through F1.

By applying the access constraints of an assigned subnet to the allocated computing resource, the operation of the computing resource becomes easier to understand and/or manage. This allows an administrator to configure the network and/or security behavior of the allocated computing resource by assigning the computing resource to a virtual subnet. From an administrator's perspective, the allocated virtual computing resource behaves similarly to a physical computing resource located on a physical subnet having a similar topology to the virtual subnet. For example, logically, X and Y are placed in a separate subnet from Z, thus the administrator expects that communications between the nodes can be restricted or controlled through the communications path between the separate subnets, for example, through the placement of firewalls F1 310 and F2 312 or other network devices on the communications path. Likewise, the administrator expects that communications between X and Y, which are placed in the same subnet, are less restricted or even unrestricted.

Meanwhile, FIG. 3B illustrates an example topology of the physical substrate network 302 associated with the virtual network 301. The physical substrate network includes computing node A 320, computing node B, and an ONM Communication Manager 150. Substrate nodes A and B are each associated with a Communication Manager 326, 328, which can store forwarding tables 330, 332 reflecting the topology of the virtual network 301. Node A is simulating the operation of virtual components X, Y and F2 while Node B is simulating the operation of virtual components on Z and F1 on their respective virtual machines.

Computing Resource Allocation Process

Figure 4:
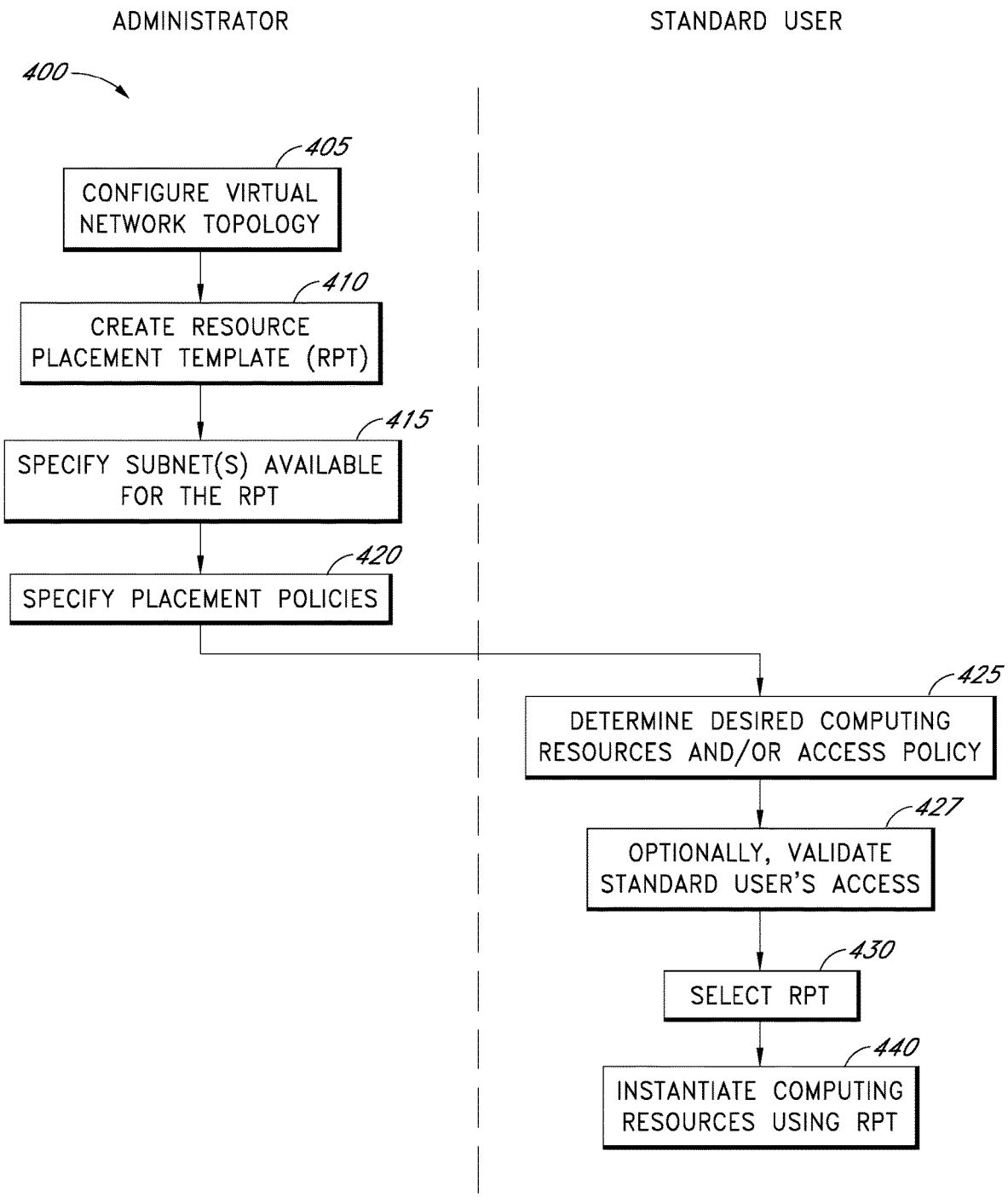
FIG. 4 illustrates a flow diagram for a process of allocating computing resources based on resource placement templates.

FIG. 4 illustrates a flow diagram for a process 400 of allocating computing resources based on RPTs usable in the example systems described above. For ease of explanation, the method will be described herein as performed by the resource management system 200 as used by an administrator 215 and a standard user 220 of a customer; however, the method may be performed wholly or partially by any other suitable computing device or system, such as by ONM system of FIG. 1 or by components of that system. In addition, the process may be performed by any user. For example, the administrator may perform the actions of the standard user.

Beginning at block 405, the administrator 215 configures a network topology for the virtual network. In one example, the administrator 215 can layout the network topology using a design program, such as VISIO, in order to create a network layout. The administrator can then send the network layout to the resource management system 200, which can use the network layout to generate a topology for a virtual network composed of one or more virtual subnets. In some embodiments, the network topology comprises a network layout, traffic rules for the network, bandwidth for nodes and/or links, latency, and/or other characteristics of the network topology. The topology of the virtual network can be used to determine, at least partly, the access constraints of a particular subnet. For example, if two subnets are not connected, then traffic from one subnet cannot reach the other. Likewise, traffic between subnets and/or networks can be managed or restricted using one or more virtual networking devices.

At block 410, the administrator 215 creates a RPT for the virtual network using the resource management system 200. The administrator can create multiple RPTs for the virtual network in order to provide network configurations for a wide range of users. The administrator can also create a default RPT for users without associated RPTs. In one embodiment, the resource management system can provide stock RPTs, such as "web server" or "database" RPTs, where the RPTs include default policies and/or subnet selection criteria that can be customized by customers At block 415, the administrator 215 specifies the subnets available for the RPT. For example, different subnets may have different levels of security and/or service levels. Certain users may be eligible for a particular security and/or service level but not others. For example, research scientists in a particular department may need access to high bandwidth networks and/or high levels of processing power. The RPT associated with that department can specify subnets with those capabilities.

In one embodiment, one or more subnets can be specified in each RPT. One of the specified subnets can then be selected as the host for an allocated computing resource. In one embodiment, the RPT can specify criteria for selecting the specified subnets. Using selection criteria can allow subnets to be dynamically selected. This can be useful where virtual subnets are dynamically created or destroyed by allowing allocation of computing resources to be based on currently existing subnets. For example, rather than allocating a computing resource to a specified subnet which may not be currently instantiated, the computing resource can be allocated to a located subnet having the desired characteristics, thereby reducing or eliminating the overhead costs associated with instantiating a new virtual subnet.

In one embodiment, specified subnets may correspond to availability zones in order to promote independent operation of computing resources, in case of failure of a data center. For example, a primary computing resource can be specified for allocation in a subnet in one availability zone while a backup computing resource is specified for allocation in another subnet in another availability zone.

At block 420, the administrator 215 specifies placement policies for the RPT that comply with the network policies of the customer. The placement polices provide rules for allocating virtual resources to particular subnets. In one embodiment, the placement policies may specify more than one acceptable subnet where a requested computing resource can be allocated. In this case, the placement policies can include selection criteria for selecting between the acceptable subnets, such as first fit, load balancing, least full, round robin, or the like. After the RPT is configured, the RPT can be stored on the resource management system 200 for use by users associated with the customer.

At block 425, the standard user 220 determines his desired computing resources and/or his desired access policy for the computing resource and submits a resource request to the resource management system 200, for example, via a data interface. The standard user can request additional storage, processing power, or the like.

At block 427, the resource management system 200 can optionally validate the user's request for resources and/or the user's access to the resource management system and/or stored RPTs. For example, the resource management system can check whether the user's account has the appropriate access privileges to request resources, access RPTs in general, and/or to access specific RPTs. In one embodiment, the resource management system may request a password and/or account identifier from the user.

At block 430, the standard user 220 selects a RPT to associate with the resource request. In one embodiment, the resource management system 200 provides a drop down list of available RPTs and can also provide descriptions of the RPT. In another embodiment, the resource management system 200 automatically selects a RPT to assign with the user request based on the user's identity. For example, the user may belong to a particular department and the resource management system 200 selects the RPT associated with that department. Other data associated with the user's identity can also be used, such as the user's security and/or service level. Once the RPT is selected, the resource management system may receive the RPT through a file uploaded by a user, a link to a file, a reference to a filed stored on the resource management system, a form, web page or application program filled out by a user, combinations of the same or the like.

At block 440, the resource management system 200 instantiates the computing resources using the selected RPT. By using the RPT, the resource management system 200 can instantiate computing resources compliant with the customers networking policies, even if the particular user requesting the resource is not knowledgeable about the policies. The process then ends and the standard user can begin using the allocated resource.

Figure 5:
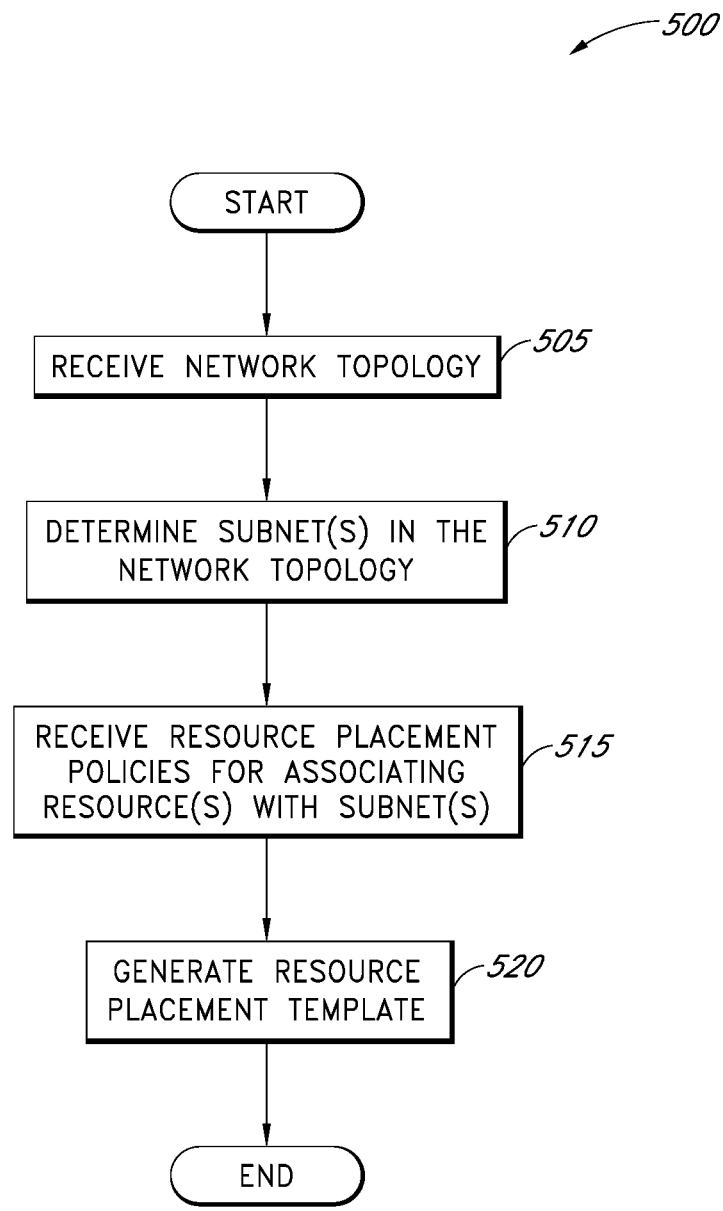
FIG. 5 illustrates a flow-diagram for a resource placement template generation process.

FIG. 5 illustrates a flow-diagram for a RPT generation process. For ease of explanation, the method will be described herein as performed by the resource management system 200; however, the method may be performed wholly or partially by any other suitable computing device or system, such as by ONM system of FIG. 1 or by components of that system.

Beginning at block 505, the resource management system 200 receives network topology data for a virtual network from a customer. In one embodiment, the resource management system 200 stores the network topology information and uses it to determine where to allocate virtual computing resources to subnets identified by the topology.

At block 510, the resource management system 200 determines the subnet(s) in the network topology. In some topologies, there may be one subnet equal to the entire virtual network, while in some others, the network contains multiple subnets. The subnet(s) may be identified by the resource management system 200 or can be identified by the customer.

At block 515, the resource management system 200 receives resource placement polices for associating virtual computing resources with the subnet(s). The policies can be used by the resource management system 200 to determine where to allocate computing resources.

At block 520, the resource management system 200 generates the RPT. The RPT can be stored on the resource management system 200 for use by users associated with the customer. The process can then end.

Figure 6:
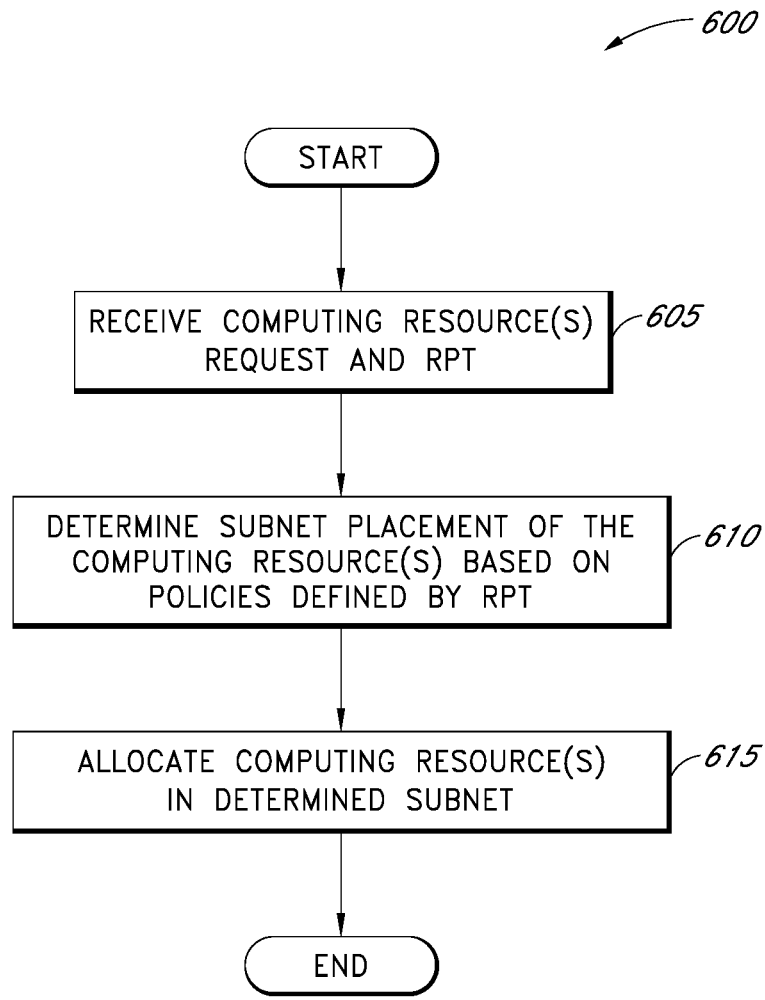
FIG. 6 illustrates a flow-diagram for a computing resource provisioning process.

FIG. 6 illustrates a flow-diagram for a computing resource provisioning process. For ease of explanation, the method will be described herein as performed by the resource management system 200; however, the method may be performed wholly or partially by any other suitable computing device or system, such as by ONM system of FIG. 1 or by components of that system.

Beginning at block 605, the resource management system 200 receives a computing resource request and associated RPT. The request and/or RPT can be received through a data interface. In one embodiment, the RPT is already stored on the resource management system 200 and the resource management system 200 receives a selection of the RPT.

At block 610, the resource management system 200 determines the subnet placement of the computer resource(s) based on the placement policies defined by the RPT. In one embodiment, the RPT identifies the subnet where a computing resource should be allocated. In one embodiment, the RPT contains rules or criteria for selecting the subnet. For example, the placement policies can specify that the computing resource be instantiated in a subnet with no access to outside networks, such as the Internet. The resource management system 200 can then search for subnets that meet that criterion. In some cases, the resource management system 200 may identify several candidate subnets that meet the criterion. The resource management system 200 can select the subnet based on customer provided selection criteria, if provided. In one embodiment, the resource management system 200 selects from the candidate subnets using its own selection criteria, if none have been provided by the customer. For example, the resource management system 200 may select a subnet associated with a physical computing node or network with a light load, in order to load balance across physical computing systems.

At block 615, the resource management system 200 allocates the virtual computing resource in the determined subnet. In one embodiment, the virtual computing resource behaves according to the configuration of the virtual subnet. For example, the computing resource can communicate with other computing resources in the subnet but can have more restricted access to computing resources outside the subnet. In another example, the computing resource can have the bandwidth, latency, and/or other characteristic specified for the virtual subnet. Allocating of the computing resource can be accomplished directly by the resource management system 200 or by communicating an allocation request to a virtual network provisioning system. The provisioning process 600 can then end after allocating the resource.

While embodiments of the disclosure have been described in terms of virtual subnets, it will be apparent that, in some embodiments, other virtual network locations can be used, such as portions of the virtual network associated with a particular data center, availability zone or other geographical area, user, customer or department and/or other network component groupings. Portions of the virtual network may be grouped into locations using various criteria and are not necessarily limited to subnetworks. In some embodiments, locations may span over multiple virtual networks.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for allocating virtual computing resources to a virtual network provided by a computing resources provider, the system comprising:
   a resource manager comprising one or more computing devices, the resource manager configured to:
      receive a request for a virtual machine in the virtual network, the virtual network comprising a plurality of subnets, the request referencing a resource placement template that identifies a first subnet in the plurality of subnets and comprises an indication of a routing path associated with the first subnet;
      obtain the resource placement template; and
      allocate the virtual machine to the first subnet, wherein one or more access constraints associated with the first subnet control how the virtual machine transmits network traffic from the virtual machine allocated to the first subnet to a second subnet in the plurality of subnets.

2. The system of claim 1, wherein the resource placement template comprises a network topology for the virtual network.

3. The system of claim 1, wherein the resource placement template is generated by a network administrator.

4. The system of claim 1, wherein the one or more access constraints comprises firewall constraints of a first virtual network location.

5. The system of claim 1, wherein the resource manager is further configured to validate the request.

6. A method for allocating virtual machines to a virtual network provided by a computing resources provider, the method comprising:
   by a computer system comprising computer hardware and that implements a resource manager:
      receiving a request for a virtual machine in the virtual network, the request referencing a resource placement template that identifies a first subnet in the virtual network and comprises an indication of a routing path associated with the first subnet; and
      allocating the virtual machine to the first subnet, wherein one or more access constraints associated with the first subnet control how the virtual machine transmits network traffic from the virtual machine allocated to the first subnet to a second subnet in the virtual network.

7. The system of claim 1, wherein the resource manager is further configured to:
   generate a network topology of the virtual network using a network layout created using a design program; and
   determine the one or more access constraints of the first subnet using the generated network topology.

8. The system of claim 7, wherein the network topology comprises at least one of the network layout, traffic rules for the virtual network, or bandwidth for nodes in the virtual network.

9. The method of claim 6, wherein the resource placement template specifies placement policies.

10. The method of claim 9, further comprising selecting the first subnet based on the placement policies.

11. The method of claim 6, further comprising obtaining the resource placement template.

12. The method of claim 6, further comprising selecting the first subnet identified by the resource placement template.

13. The method of claim 6, further comprising selecting the first subnet using selection criteria specified by the resource placement template.

14. The method of claim 6, wherein a topology of the virtual network includes at least one firewall.

15. The method of claim 6, wherein a topology of the virtual network at least partly determines access constraints for a first virtual network location.

16. A non-transitory computer-readable storage medium having stored thereon instructions that, when executed, direct a computing system that implements a resource manager to perform a process for allocating virtual machines, the process comprising:
   receiving a request for a virtual machine in a virtual network, the request referencing a resource placement template that identifies a first subnet in the virtual network and comprises an indication of a routing path associated with the first subnet; and
   allocating the virtual machine to the first subnet, wherein one or more access constraints associated with the first subnet control how the virtual machine transmits network traffic from the virtual machine allocated to the first subnet to a second subnet in the virtual network.

17. The non-transitory computer-readable storage medium of claim 16, wherein the resource placement template specifies placement policies.

18. The non-transitory computer-readable storage medium of claim 17, wherein the process further comprises selecting the first subnet based on the placement policies.

19. The non-transitory computer-readable storage medium of claim 16, wherein the process further comprises obtaining the resource placement template.

\* \* \* \* \*